United States Patent [19]

Papenhagen et al.

[11] Patent Number: 4,785,691
[45] Date of Patent: Nov. 22, 1988

[54] DEVICE FOR REGULATING AN INTERNAL COMBUSTION ENGINE IN A MOTOR VEHICLE

[75] Inventors: Dieter Papenhagen, Backnang; Klaus-Achim Schneider, Stuttgart, both of Fed. Rep. of Germany

[73] Assignee: Daimler-Benz Aktiengesellschaft, Stuttgart, Fed. Rep. of Germany

[21] Appl. No.: 24,069

[22] Filed: Mar. 10, 1987

[30] Foreign Application Priority Data

Mar. 22, 1986 [DE] Fed. Rep. of Germany ....... 3609849

[51] Int. Cl.$^4$ ........................ B60K 41/04; F02D 11/04
[52] U.S. Cl. ..................................... 74/877; 123/342; 123/361
[58] Field of Search .................... 192/0.07, 0.096; 74/514, 513, 470, 625, 843, 877; 123/359, 399, 400, 361, 342; 180/333, 336

[56] References Cited

U.S. PATENT DOCUMENTS

| | | | |
|---|---|---|---|
| 2,821,091 | 1/1958 | Benner | 74/513 |
| 2,823,555 | 2/1958 | Cislo | 74/877 |
| 3,034,373 | 5/1962 | Walker | 74/877 |
| 3,308,678 | 3/1967 | Walker | 74/843 |
| 3,498,156 | 3/1970 | McAllister et al. | 74/513 |
| 4,530,326 | 7/1985 | Mann et al. | 123/342 |

FOREIGN PATENT DOCUMENTS

| | | |
|---|---|---|
| 3307968 | 9/1984 | Fed. Rep. of Germany . |
| 0122742 | 7/1984 | Japan ................... 123/400 |
| 0196938 | 11/1984 | Japan ................... 123/399 |

OTHER PUBLICATIONS

"Quick Adjustment on Automatic Drive Linkage," *Motor*, vol. 108, No. 5 (Nov. 1957), pp. 82-83, 253-254.

*Primary Examiner*—Rodney H. Bonck
*Assistant Examiner*—Richard M. Lorence
*Attorney, Agent, or Firm*—Barnes & Thornburg

[57] ABSTRACT

A device for regulating an internal combustion engine in a motor vehicle is provided with an electrical desired-value transmitter adjustable between an idling position and a full-load position, an actuator, and a regulating member coupled mechanically to the actuator. The set position of the desired-value transmitter is transmissible to the actuator via an electrical transmission circuit via which signals can be entered from further regulating variables; and also to the regulating member via a mechanical transmission member of variable length which can be connected to the desired-value transmitter via a connecting lever. So that this regulating device can be installed with the least possible changes in a vehicle without impairing its emergency running properties and the input of further regulating variables, a drag lever is provided that connects the accelerator pedal to the desired-value transmitter. The connecting lever can be dragged along with the drag lever during the adjustment of the drag lever in the direction of full load. Between the full-load position and the particular position of the drag lever, the connecting lever is adjustable independently of the drag lever. A signal output for activating the power transmission between the internal combustion engine and the vehicle drive is connected to the connecting lever.

6 Claims, 3 Drawing Sheets

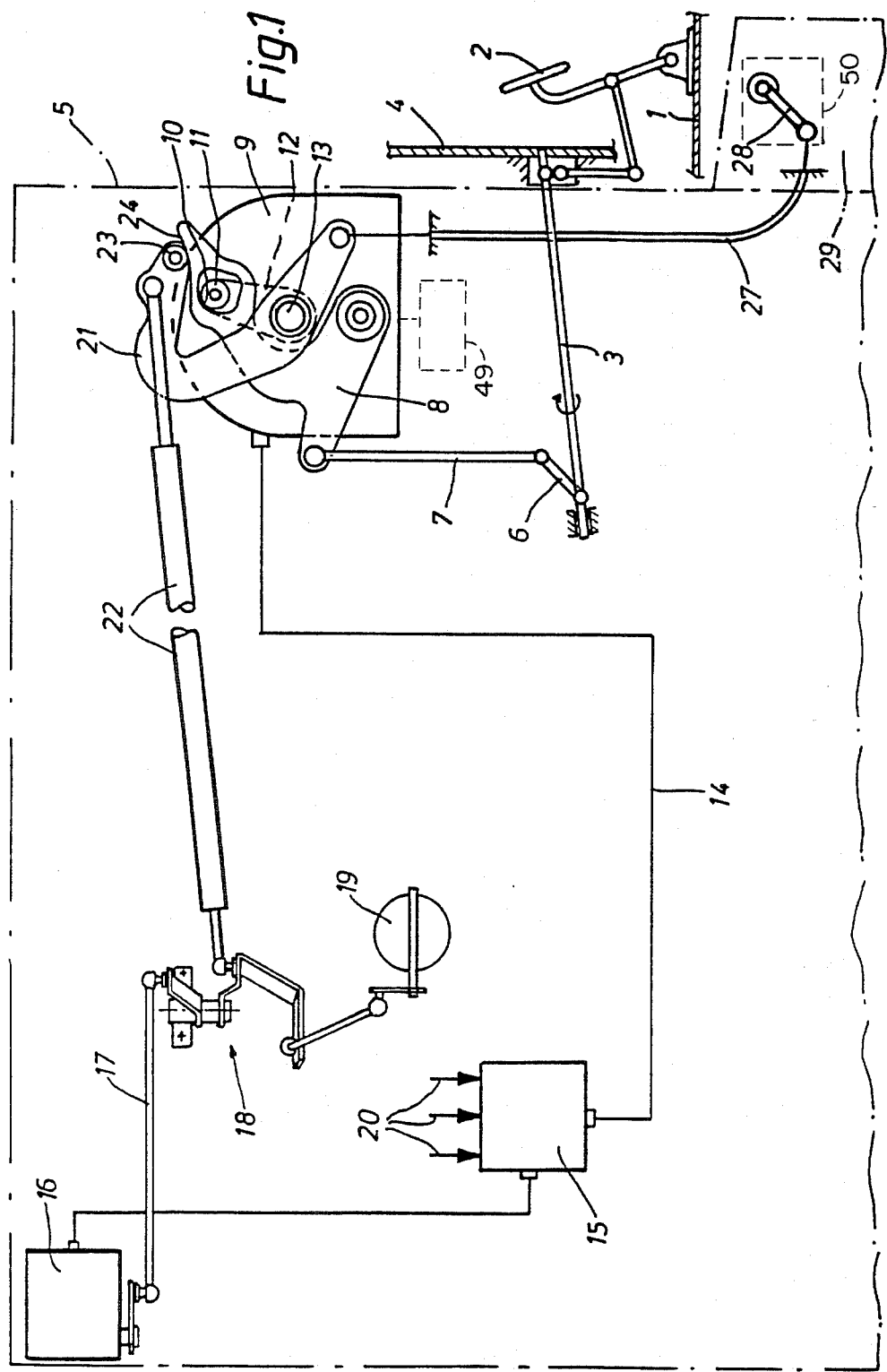

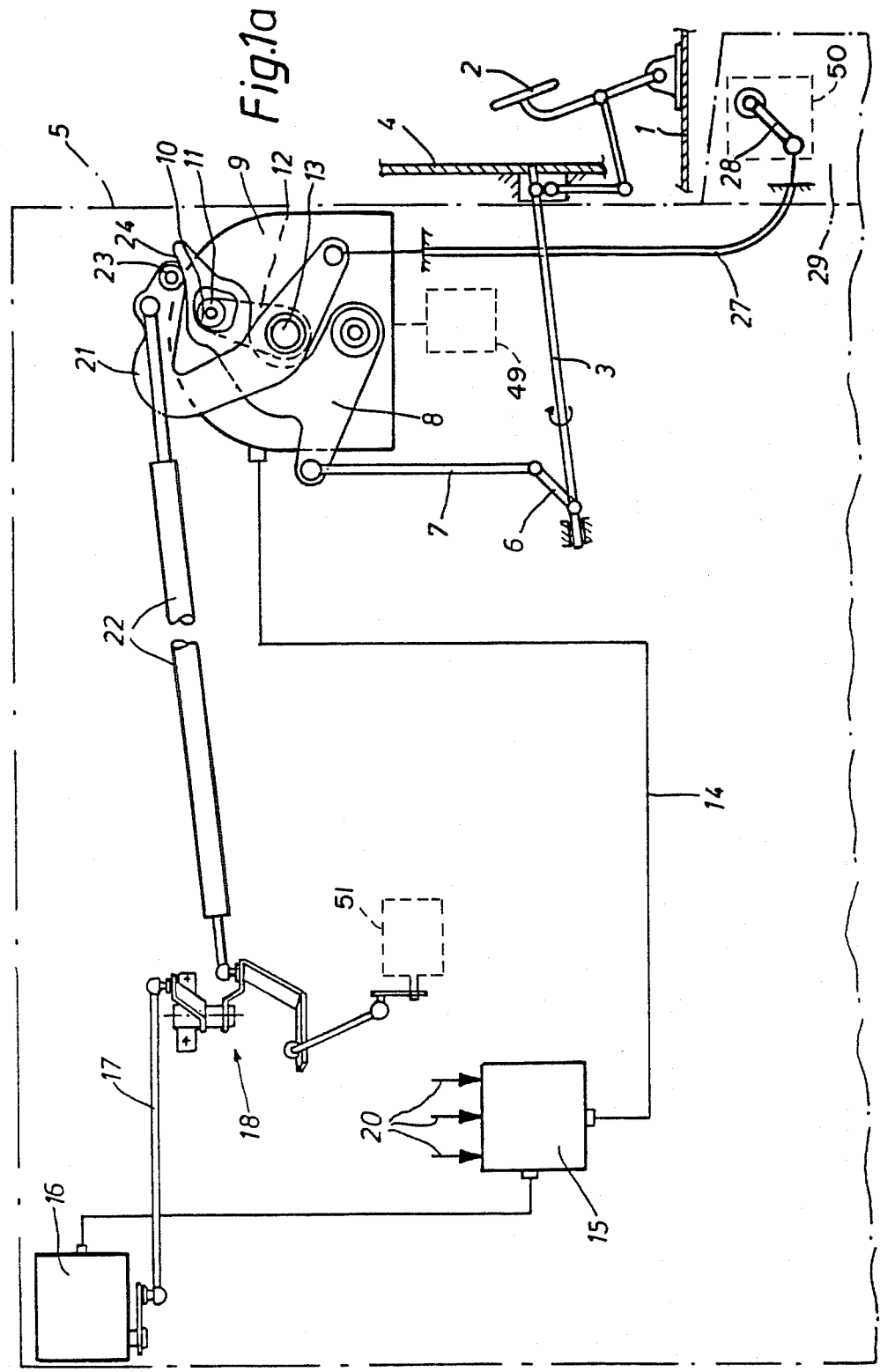

DEVICE FOR REGULATING AN INTERNAL COMBUSTION ENGINE IN A MOTOR VEHICLE

BACKGROUND AND SUMMARY OF THE INVENTION

The present invention relates to a device for regulating an internal combustion engine in a motor vehicle, with an electrical desired-value transmitter that is adjustable between an idling and a full-load position by an accelerator pedal. An actuator actuates a regulating member mechanically coupled to the actuator. An electrical control unit connected between the actuator and the desired-value transmitter receives set position signals from the desired-value transmitter and outputs control signals to control the actuator. A mechanical transmission element of variable length is connected between a connecting lever that is connected to the desired-value transmitter, and the regulating member.

A device of this general type is shown in German Published Unexamined Patent Application No. 3,307,968. In this device, the position of the connecting lever and the part of the mechanical transmission element fixedly connected to the connecting lever is directly dependent on the position of the desired-value transmitter and therefore of the accelerator pedal. Consequently, although an emergency running is ensured in the event of a failure of the electrical transmission means, nevertheless, despite idle travels in the mechanical transmission element, it is possible to enter additional functions only to a limited extent. These idle travels make it impossible for the position of the regulating member to be returned accurately to the region of the desired-value transmitter via the mechanical transmission element, so that signals which are dependent on the position of the regulating member and which are necessary for operating the internal combustion engine or the vehicle cannot be picked up in the region of the desired-value transmitter.

An object of the present invention is to provide a regulating device that, without impairing the emergency running properties and the input of additional functions, provides in the region of the desired-value transmitter a signal dependent on the position of the regulating member and intended for controlling the operation of the internal combustion engine or of the motor vehicle.

This and other objects of the present invention are achieved in the provision of a device according to a preferred embodiment of the present invention for regulating an internal combustion engine with a drag lever that connects the accelerator pedal to a desired-value transmitter. The drag lever drags the connecting lever (connected to the desired-value transmitter) along with the drag lever during the adjustment of the drag lever in the full-load position. The connecting lever is adjustable independently of the drag lever by adjusting means if the drag lever is not at full-load position. The connecting lever is further operatively connected to signal output means for activating the power transmission between the internal combustion engine and the vehicle drive, in response to movement of the connecting lever.

The device according to the invention provides control of the internal combustion engine under emergency running conditions via the mechanical transmission element, without the input and transmission of additional functions to the regulating member being disturbed by the transmission element.

Furthermore, the device according to the invention offers an advantage, under specific operating conditions, such as when under this operating condition, the position of the accelerator pedal differs from the position of the regulating member, this regulating member being critical for controlling vehicle units such as the gear shift of an automatic transmission. The advantage is that the signal for this control at the connecting lever is available at the desired-value transmitter. Thus, when the desired-value transmitter is in an appropriate position, on vehicles in which either the device according to a preferred embodiment of the invention or a purely mechanical linkage for regulating the internal combustion engine is installed, the signal for controlling the vehicle unit is available at the same place and in the same form. Therefore, both the linkage between the accelerator pedal and the desired-value transmitter and the transmission device for the signal can have an identical design in both types of regulation, thus resulting in a considerable simplification in construction.

The connection of the signal output means to a gear change circuit of an automatic transmission provided in a preferred embodiment of the present invention, provides control of special parts in the power transmission of the motor vehicle.

A mechanical transmission element is part of a preferred embodiment of the device according to the present invention, and makes a rigid connection between the regulating member and the connecting lever. Due to this element, the connecting lever is not adjusted further in the direction of full load than the regulating member, yet the transmission element allows this differing adjustment to be made under normal driving conditions, and at the same time makes it possible to transmit the adjustment to the regulating member under emergency running conditions.

In a further preferred embodiment, the regulating shaft is mounted with permanent accuracy because of its direct interaction with the electrical parts of the desired-value transmitter. This is difficult because of the short length of the desired-value transmitter. By so mounting the regulating shaft, it is relieved of all the forces exerted by the regulating devices.

The fastening of the desired-value transmitter to the engine, as provided in certain preferred embodiments of the present invention, offers the advantage that the entire regulating linkage between the accelerator pedal and the internal combustion engine, together with its transmission ratios, plays, resistances and restoring forces, can have the same design, irrespective of whether a purely mechanical regulating linkage or an electrical regulating system, as provided in certain preferred embodiments of the present invention, is installed.

Other objects, advantages and novel features of the present invention will become apparent from the following detailed description of the invention when considered in conjunction with the accompanying drawings.

BRIEF DESCRIPTION OF THE DRAWINGS

FIG. 1 shows a side view of a regulating device for an internal combustion engine constructed in accordance with a preferred embodiment of the present invention installed in a motor vehicle, FIG. 1A shows a variant of FIG. 1, wherein an injection pump is controlled.

DETAILED DESCRIPTION OF THE DRAWINGS

Figure 2:
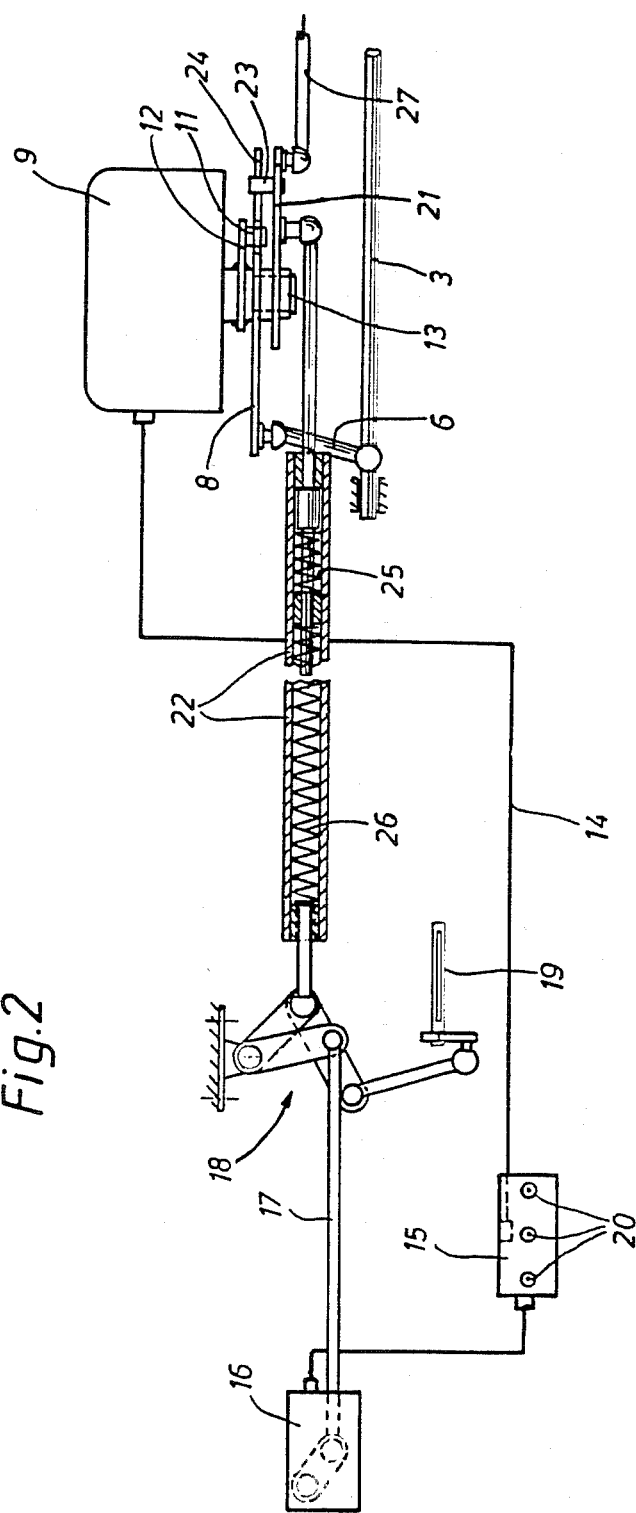
FIG. 2 shows a plan view of the device of FIG. 1.

An accelerator pedal 2 mounted in a body part 1 of the motor vehicle actuates a longitudinal shaft 3 which is mounted rotatably at one end in a body part 4, and at the other end on the internal combustion engine 5 shown diagrammatically. A rotation of the longitudinal shaft 3 is transmitted to a drag lever 8, via a lever 6 and a rod 7. The drag lever 8 is mounted on a desired-value transmitter 9 fastened to the internal combustion engine 5, or to a part 49 fixedly connected to the engine 5. Fashioned in the drag lever 8 is a slot 10, into which engages a roller 11, which in preferred embodiments is plastic. The roller 11 is fastened to one end of a regulating lever 12 which is connected at its other end fixedly in terms of rotation to a regulating shaft 13. By means of the regulating shaft 13, an electrical signal is generated in a known way within the desired-value transmitter 9 as a function of its rotational position. This signal is fed by the cable 14 via an electronic control unit 15, to an actuator designed as a servo-motor 16. This adjusts a regulating member designed as a throttle flap 19 by means of a rod 17 and an adjusting lever 18. Alternatively, a regulating member is designed as a control rod of an injection pump, schematically indicated as element 51 in FIG. 1A.

Via the electronic control 15, it is possible to enter further control variables which are indicated by arrows 20, and which vary or replace completely the regulating signal transmitted from the accelerator pedal 2 to the servo-motor 16. These control variables can be, for example, automatic speed regulation for the vehicle or slip regulation for the vehicle wheels.

Furthermore, a mechanical connection can be made between the drag lever 8 and the adjusting lever 18, and comprises a connecting lever 21 and a transmission element designed as a connecting rod 22. The connecting lever 21 is mounted rotatably on the regulating shaft 13 and rests by means of a plastic roller 23 attached to one of its ends against a guide track 24 of the drag lever 8. The connecting rod 22, which is fastened to the connecting lever 21 near the roller 23, is of variable length, its maximum length corresponding to the distance between its fastening points on the connecting lever 21 and on the adjusting lever 18 in their idling position. Thus, if the adjusting lever 18 is shifted further in the direction of full load than the drag lever 8, the connecting lever 21 is lifted by the connecting rod 22, the roller 23 moving away from the guide track 24.

Within the connecting rod 22, two compression springs 25 and 26 (FIG. 2), with greatly differing spring forces, are arranged in series, so that the connecting rod 22 offers a resistance increasing in steps to a shortening of its length. The spring excursion of the weaker compression spring 25 is such that the strong compression spring 26 is only compressed when the connecting lever 21 reaches approximately half its full-load adjustment, with the adjusting lever 18 in the idling position.

Moreover, a Bowden pull wire 27 leads from the connecting lever 21 to a shift lever 28 which is part of an automatic transmission 29. Through this switch lever 28, a signal is entered in a gear-change circuit 50 for changing gears of the transmission 29 for shift control through the position of the throttle flap 19 and consequently through the load of the internal combustion engine 5.

Under normal fault-free operating conditions, an adjustment of the accelerator pedal 2 is transmitted, via the drag lever 8 and the regulating lever 12, to the regulating shaft 13. This generates in the desired-value transmitter 9 an electrical signal fed via the cable 14 to the servo-motor 16 which adjusts the throttle flap 19 by the adjusting lever 18. The connecting lever 21 and the connecting rod 22 are dragged along by the drag lever 8 and adjusting lever 18, so that the load signal transmitted to the automatic transmission 29 by the Bowden pull wire 27 corresponds to the position of the throttle flap 19.

In the event of a fault, such as when the electrical regulating system fails, emergency running is possible. If the servo-motor 16 is dead, when the accelerator pedal 2 is actuated the connecting lever 21 is dragged along by the drag lever 8. Consequently, the connecting rod 22 is compressed, until the adjusting lever 18 and therefore the throttle flap 19 are adjusted as a result of the spring force of the strong compression spring 26. Driving at up to approximately half the load of the internal combustion engine is therefore possible.

When the vehicle is operating with automatic speed regulation, a signal is entered in the electronic unit 15 according to one of the arrows 20, and the throttle flap 19 is adjusted according to the signal by the servo-motor 16 via the adjusting lever 18. Since under these operating conditions, the accelerator pedal 2 is conventionally held in the idling position or in a low-load position, the connecting lever 21, which is connected via the connecting rod 22 to the adjusting lever 18 so as to be free of play in the pulling direction, comes away from the drag lever 8 and assumes a position corresponding to the position of the throttle flap 19. The automatic transmission 29, too, is consequently shifted according to the actual load of the internal combustion engine through Bowden cable 27. If the driver intervenes in the speed regulation by adjusting the accelerator pedal 2 further in the direction of full load than corresponds to the signal for automatic speed regulation, the connecting lever 21 is taken up both by the drag lever 8 and by the connecting rod 22, and the signal for the automatic transmission 29 is consequently also adapted.

If the vehicle has automatic slip regulation for the vehicle wheels, in the event of excessive slip of a particular wheel, a signal corresponding to an arrow 20 is entered in the electronic control unit 15 which causes the servo-motor 16 to adjust the throttle flap 19 in the direction of idling. In this situation, the throttle flap 19 is adjusted independently of the position of the accelerator pedal 2, the connecting rod 22 being compressed. As long as only the weak compression spring 25 takes effect, the restoring force exerted on the accelerator pedal 2 is only slight, but with an increasing difference between the position of the accelerator pedal and that of the throttle flap the restoring force exerted by the compressed connecting rod 22 increases, in such a way that the driver is obliged to ease off from the accelerator pedal 2 and thus adapt its position to that of the throttle flap 19. The shifting of the transmission 29, possibly not adapted to the position of the throttle flap under these operating conditions, at least has no adverse influence on the driving behavior of the vehicle.

From the preceding description of the preferred embodiments, it is evident that the objects of the invention are attained, and although the invention has been described and illustrated in detail, it is to be clearly understood that the same is by way of illustration and example only and is not to be taken by way of limitation. The spirit and scope of the invention are to be limited only by the terms of the appended claims.

What is claimed is:

1. A device for regulating the fuel flow to an internal combustion engine in a motor vehicle, with an electrical desired-value transmitter means adjustable between an idling position and a full-load position by an accelerator pedal, with an actuator means for actuating a regulating member, said regulating member being coupled mechanically to said actuator means, electrical control means connected between said desired-value transmitter means and said actuator for receiving set position signals from said transmitter means and sending output control signals to control said actuator means, and a mechanical transmission element of variable length connected between a connecting lever connected to said desired-value transmitter and said regulating member, the improvement comprising:

drag lever means for connecting said accelerator pedal to said desired-value transmitter means, and for moving said connecting lever with said drag lever means during adjustment of said drag lever means in the direction of said full-load position;

adjusting means for adjusting said connecting lever independently of said drag lever means if said drag lever means is not a full-load position;

wherein said connecting lever is further connected to transmission signal output means for controlling the power transmission between said internal combustion engine and a vehicle drive, wherein said transmission signal output means is connected to a gear-change circuit for changing gears of an automatic transmission for controlling said circuit, wherein said mechanical transmission element is a connecting rod which has no play when moved in one direction and which is shortened in a step-increasing manner in an opposite direction by a resistance means.

2. The device according to claim 1, wherein said desired-value transmitter includes a regulating shaft to which a regulating lever is fixedly connected with respect to rotation, said connecting lever being moved by said drag lever through said regulating lever.

3. The device according to claim 2, wherein said desired-value transmitter means is fastened to said internal combustion engine.

4. The device according to claim 3, wherein said desired-value transmitter means is fastened to a part connected fixedly to said internal combustion engine.

5. A device according to claim 1, wherein said regulating member is a throttle flap.

6. A device according to claim 1, wherein said regulating member is a control rod of an injection pump.

* * * * *